United States Patent [19]
Sasada

[11] Patent Number: 5,267,057
[45] Date of Patent: Nov. 30, 1993

[54] IMAGE SCANNING AND RECORDING METHOD AND APPARATUS FOR COMPENSATING FOR A PYRAMIDAL ERROR OF A ROTATING POLYGON

[75] Inventor: Shigeru Sasada, Kyoto, Japan

[73] Assignee: Dainippon Screen Mfg., Co., Ltd., Kyoto, Japan

[21] Appl. No.: 738,347

[22] Filed: Aug. 14, 1991

[30] Foreign Application Priority Data

Aug. 21, 1990 [JP] Japan .................. 2-220311

[51] Int. Cl.⁵ .................................. H04N 1/04
[52] U.S. Cl. ........................ 358/481; 358/480; 358/474; 358/471; 250/236; 346/108; 346/160
[58] Field of Search .......... 358/481, 474, 480, 412; 346/108, 160; 250/235, 236

[56] References Cited

U.S. PATENT DOCUMENTS

| | | | |
|---|---|---|---|
| 4,270,131 | 5/1981 | Tompkins et al. | 358/481 |
| 5,023,448 | 6/1991 | Kessler et al. | 358/481 |
| 5,043,744 | 8/1991 | Fantuzzo et al. | 358/474 |
| 5,046,796 | 9/1991 | Andoh et al. | 358/481 |

Primary Examiner—Edward L. Coles, Sr.
Assistant Examiner—Fan Lee
Attorney, Agent, or Firm—Brumbaugh, Graves, Donohue & Raymond

[57] ABSTRACT

An image scanning and recording method for compensating for a pyramidal error of a mirror surface of a rotating body having at least two reflective mirror surfaces by fine-adjusting an angle of a light beam incident on the rotating body. A scanning lens is put in such a manner that an optical axis of the scanning lens is orthogonal to a rotating axis of the rotating body. An angle made of the incident light beam and a main scanning plate is controlled so that equations (I) and (II) are selectively fulfilled, the main scanning plane being orthogonal to the rotating axis and including the optical axis:

$$\tan a = \tan 2\delta \cdot \cos(a-b) \qquad (I)$$

$$a = 2\delta \cdot \cos(a-b) \qquad (II)$$

where a: a rotating angle of a normal line standing on each mirror surface with respect to the optical axis of the scanning lens, b: an angle made of the incident beam and the optical axis of the scanning lens on the main scanning plane, and δ: the pyramidal error of each mirror surface with respect to the rotating axis.

16 Claims, 6 Drawing Sheets

IMAGE SCANNING AND RECORDING METHOD AND APPARATUS FOR COMPENSATING FOR A PYRAMIDAL ERROR OF A ROTATING POLYGON

BACKGROUND OF THE INVENTION

(1) Field of the Invention

This invention relates to an image scanning method for compensating for a pyramidal error of a polygon mirror by fine-adjusting an angle of a light beam incident on the polygon mirror and to an image scanning apparatus for carrying out such a method.

(2) Description of the Prior Art

In a laser beam scanning method using a polygon mirror, the laser beam is generally incident on a mirror surface of the polygon mirror from a direction which makes a certain angle with an optical axis of a scanning lens such as an f·θ lens and belongs to a main scanning plane. The main scanning plane is orthogonal to a rotating axis of the polygon mirror and includes the optical axis in this specification.

When the polygon mirror has a pyramidal error, the laser beam reflected on the mirror surface is deviated and led to outside the main scanning plane. A locus of the beam on a plane to be scanned (namely, a line made of dots formed on the plane in the main scanning direction; will be referred to as a trace line) is deviated in a sub scanning direction or curved. Therefore, the trace lines have poor parallelism and non-uniform pitches, which deteriorates image quality drastically.

The above problem is solved by compensating for the pyramidal error.

An angle made of the light beam reflected from the polygon mirror and the main scanning plane is varied by a rotating angle of the rotating axis of the polygon mirror even on the same trace line. Accordingly, a highly precise compensation for the pyramidal error requires a total pyramidal error to be considered. The total pyramidal error means the combination of a "static" pyramidal error which is inherent in manufacturing the polygon mirror and an "active" pyramidal error which is influenced by the rotating angle of the rotating axis.

If the "active" pyramidal error is not considered, the rotation of the polygon mirror accompanies constant changes in the angle made of the reflected beam and the main scanning plane, whereby a focusing point of the reflected beam is changed. Accordingly, the trace line is asymmetrically curved with respect to the ideal scanning line which corresponds with the X axis of FIG. 1.

Japanese Patent Publication Kokai No. 58-100117 has disclosed a technology for compensating for the total pyramidal error. This publication teaches obtaining the relationship between a pyramidal error $\delta$ and a deviation amount $\Delta$ of the trace line from the ideal scanning line on the plane to be scanned in the sub scanning direction.

This is not enough to compensate for the total pyramidal error for the following reason.

In order to eliminate the deviation or the curve of the trace line, the angle of incidence of the light beam on a polygon mirror should be adjusted so that the deviation amount $\Delta=0$, namely, the pyramidal error $\delta$ is eliminated, whereby keeping the reflected beam within the main scanning plane. Such an adjustment is carried out by 1) obtaining the relationship among the pyramidal error $\delta$, an angle made of a normal line on the mirror surface and the optical axis of the scanning lens, the angle made of the incident beam and the optical axis, and the angle made of the incident beam and the main scanning plane and then 2) controlling the angle of incidence on the polygon mirror so as to realize $\Delta=0$ based on the above-obtained relationship.

However, this publication does not teach any practical equation indicating the above relationship. Therefore, it is practically impossible to carry out a constant real-time compensation in synchronization with the rotation of the polygon mirror according to this publication.

SUMMARY OF THE INVENTION

Accordingly, this invention has an object of offering an image scanning method for precisely compensating for a pyramidal error of a polygon mirror by surely eliminating a deviation of a trace line from the ideal scanning line in a sub scanning direction.

Another object of this invention is to offer an image scanning apparatus for carrying out the above method with a simple construction.

The above objects are fulfilled by an image scanning method for compensating for a pyramidal error of a mirror surface of a rotating body having at least two reflective mirror surfaces by fine-adjusting an angle of a light beam incident on the rotating body. The above method is characterized in that a scanning lens is put in such a manner that an optical axis of the scanning lens is orthogonal to a rotating axis of the rotating body; and that an angle $\alpha$ made of the incident light beam and a main scanning plate is controlled so that equations (I) and (II) are selectively fulfilled, the main scanning plane being orthogonal to the rotating axis and including the optical axis:

$$\tan\alpha = \tan 2\delta \cdot \cos(a-b) \quad (I) \quad \alpha = 2\delta \cdot \cos(a-b) \quad (II)$$

where a: a rotating angle of a normal line standing on each mirror surface with respect to the optical axis of the scanning lens, b: an angle made of the incident beam and the optical axis of the scanning lens on the main scanning plane, and $\delta$: the pyramidal error of each mirror surface with respect to the rotating axis.

The rotating body may be a polygon mirror.

The rotating angle of the normal line may be obtained by a fine unit based on an origin of the rotating axis of the polygon mirror, a start of a main scanning of each mirror surface, and which portion of one of the mirror surfaces is used for scanning judged based on the time from the start of the main scanning of the above one of the mirror surfaces; and the pyramidal error may be measured in advance.

The above objects are also fulfilled by an image scanning apparatus for compensating for a pyramidal error of a mirror surface of a rotating body having at least two reflective mirror surfaces by fine-adjusting an angle of a light beam incident on the rotating body. The apparatus comprises a scanning lens provided in such a manner that an optical axis thereof is orthogonal to a rotating axis of the rotating body; a detecting device for continuously detecting which portion of which mirror surface of all the mirror surfaces of the rotating body is used for scanning; a compensating amount outputting device for outputting such a value of an angle $\alpha$ that selectively fulfills equations (I) and (II) based on a pyramidal error $\delta$ of each mirror surface measured in advance and the detection result of the detecting device, the angle α being made of the incident light beam and the main scanning plane which is orthogonal to the rotating axis of the rotating body and includes the optical axis of the scanning lens, and the equations (I) and (II) indicating the relationship between the angle α and each portion of the mirror surface, the relationship being required to keep the light beam reflected on the mirror surface within a main scanning plane; and an adjusting device for adjusting the angle of the light beam incident on the rotating body by the value of outputted α by the compensating amount outputting device:

$$\tan\alpha = \tan 2\delta \cdot \cos(a-b) \quad \text{(I)}$$

$$\alpha = 2\delta \cdot \cos(a-b) \quad \text{(II)}$$

where a: a rotating angle of a normal line standing on each mirror surface with respect to the optical axis of the scanning lens, b: an angle made of the incident beam and the optical axis of the scanning lens on the main scanning plane, and δ: the pyramidal error of each mirror surface with respect to the rotating axis.

The rotating body may be a polygon mirror and the adjusting device may be an acoustic optical deflector.

The detecting device may comprise a first detecting section for detecting an origin of the rotating axis of the polygon mirror; a second detecting section for detecting a start of a main scanning of each mirror surface; and a judging section for judging which portion of one of the mirror surfaces is used for scanning based on the time from the start of the main scanning of the above one of the mirror surfaces; wherein the rotating angle of the normal line may be obtained by a fine unit based on the detection results of the first and second detecting section and on the judging result of the judging section, and wherein the pyramidal error may be measured in advance.

The compensating amount outputting device may include an operating section for obtaining the value of the angle α by selectively executing the equations (I) and (II) based on the rotating angle a of the normal line, the angle b and the pyramidal error δ.

The compensating amount outputting device may be a memory whose address is the rotating angle a of the normal line and which stores data concerning a pyramidal error compensating amount corresponding to the address.

According to the equation (I), the relationship between the angle α, which is made of the incident beam and the main scanning plane, and (a−b), which defines the influence of the "active" pyramidal error is fixed if the pyramidal error δ of each mirror surface is obtained. The reflected beam is kept within the main scanning plane by adjusting the value of α and thus controlling the angle of incidence of the light beam. As a result, the influence of the "active" pyramidal error is surely eliminated.

The equation (I) indicates the strict relationship between α and (a−b). Since the angle α and the pyramidal error δ are usually negligibly small, the angle α may be controlled in accordance with the equation (II), which is the approximate expression.

According to the above method and construction, the angle of incidence is controlled by compensating for both the "static" pyramidal error inherent in manufacturing the polygon mirror and the "active" pyramidal error caused by the rotation of the polygon mirror in accordance with the equations (I) and (II). Consequently, the reflected beam is kept within the main scanning plane. The trace lines are straight, parallel and pitched uniformly with no asymmetrical curve, which realizes a high image quality and an excellent image reading ability.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF A PREFERRED EMBODIMENT

Overall Construction and Operation

Figure 1:
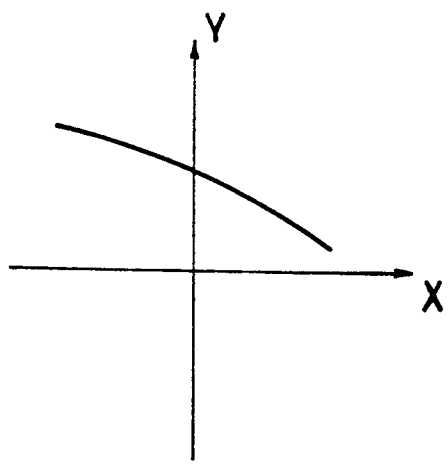
FIG. 1 shows a trace line made in a conventional image scanning apparatus.
Figure 2:
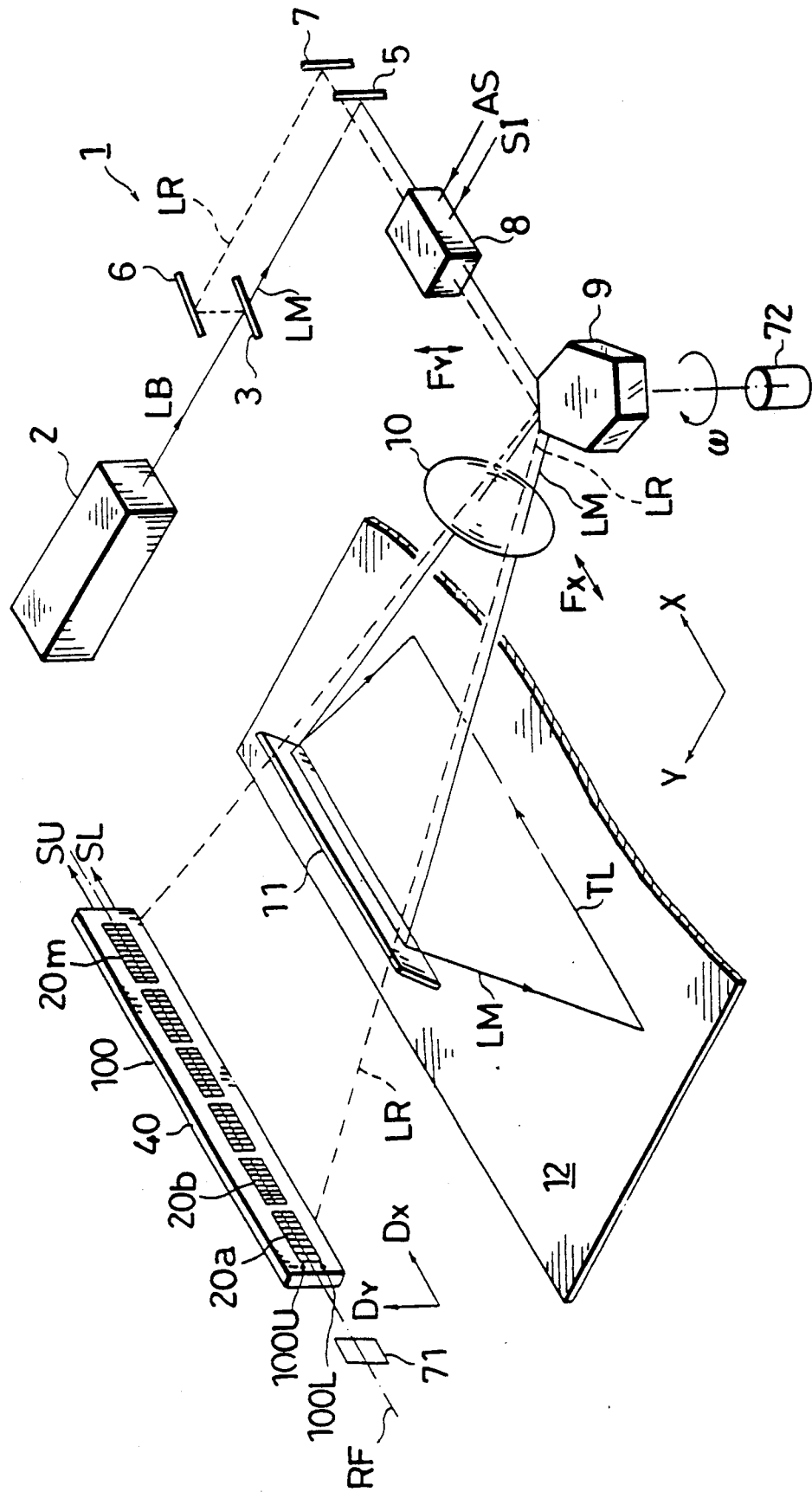
FIG. 2 is a perspective view showing an overall construction of an image scanning apparatus as an embodiment of this invention.

FIG. 2 is a perspective view showing an overall construction of an image scanning apparatus 1 as an embodiment of this invention.

The image scanning apparatus 1 is a flatbed-scanning type prepressing scanner equipped with a rotatable polygon mirror. X and Y indicate main and sub scanning directions, respectively.

A laser beam LB generated by a laser beam source 2 is divided into a main beam LM and a reference beam LR by a half mirror 3.

The main beam LM is reflected on a mirror 5 and is incident on an acoustic optical deflector (AOD) acting as a deflecting device. The AOD 8 receives an image signal SI for ON/OFF-modulating the main beam LM from a signal generating device (not shown), whereby an image is recorded on a photoconductive body 12 as will be described later.

The reference beam LR is reflected on mirrors 6 and 7 and is incident on the AOD 8 in parallel with the main beam LM. The AOD 8 receives an angle adjusting signal AS for continuously fine-adjusting an angle of incidence of the beams LM and LR on a mirror surface of the polygon mirror 9. The signal AS is sent from a control device (FIG. 5) based on a pyramidal error of the polygon mirror 9. In accordance with the signal AS, the AOD 8 deflects the main beam LM and the reference beam LR in $F_y$ directions, which are optically equivalent with the sub scanning direction Y. The deflecting angles for the main beam LM and the reference beam LR are substantially equal to each other.

Then, the main beam LM and the reference beam LR are incident on the polygon mirror 9 rotating at a certain speed in an ω direction. As a result, the main beam LM and the reference beam LR are deflected periodically in $F_x$ directions in accordance with the rotation of the polygon mirror 9. The $F_x$ directions are optically equivalent with the main scanning direction X.

The main beam LM goes through a scanning lens 10 comprising an $f\cdot\theta$ lens or the like, and is reflected on a mirror 11 toward the photoconductive body 12. In accompaniment with the rotation of the polygon mirror 9, the main beam LM scans the photoconductive body 12 in the main scanning direction X and exposes portions of a surface of the body 12 one by one. A scanning locus of the main beam LM, namely, a trace line defines a scanning line in image recording.

The photoconductive body 12 is moved in the sub scanning direction Y with respect to the main beam LM by a transporting device (not shown), whereby a two-dimensional latent image is recorded on the photoconductive body 12 in accordance with the signal SI.

The reference beam LR, after being deflected, goes through the scanning lens 10 and is incident on a photosensor array 100 acting as a grating sensor. The photosensor array 100 comprises a longitudinal insulating substrate 40 and a plurality of photosensors 20a, 20b, . . . and 20m linearly fixed on the substrate 40. A longitudinal direction $D_x$ and a transverse direction $D_y$ of the array 100 are optically equivalent with the main and the sub scanning directions X and Y, respectively. In other words, the photosensor array 100 is equivalently located with respect to the main beam LM on the photoconductive body 12, namely, the trace line.

Each photosensor comprises an upper portion and a lower portion which are provided in parallel. The upper portions of the photosensors are all electrically connected to form an upper sensor array 100U, and the lower portions of the photosensors are all electrically connected to form a lower sensor array 100L.

The reference beam LR, which are received by the photosensor array 100, is photoelectric-transferred by the upper and lower sensor arrays 100U and 100L to be sent to the control device 70 as a pair of signals SU and SL.

The signals SU and SL indicate how much the reference beam LR is deflected in the sub scanning direction Y on the photosensor array 100 from a reference line RF, which is a border between the upper sensor array 100U and the lower sensor array 100L. Even if the pyramidal error is theoretically compensated, the trace line sometimes has a slow curve by the swing of the rotating axis of the polygon mirror 9. The signals SU and SL are used to correct the trace line TL in such a case.

The photosensor array 100 may be replaced by another device.

A start sensor 71 for detecting the reference beam LR is provided outside an area corresponding to an exposing area of the main beam LM, the area being within a scanning area of the reference beam LR. An origin pulse generator 72 is connected to the rotating axis of the polygon mirror 9.

While the polygon mirror 9 is rotated once, the generator 72 generates an origin pulse and simultaneously the start sensor 71 detects the reference beam LR. The mirror surface which is used for scanning at this time is a first mirror surface. It is judged that a second mirror surface is used for scanning when the start sensor 71 detects the reference beam LR again. In this way, which mirror surface is used for scanning is judged by counting how many times the starting sensor 71 has detected the reference beam LR.

Which portion of the mirror surface is used for scanning is judged by measuring the time which has passed since the start sensor 71 detectes the reference beam.

Principle of Pyramidal Error Compensation

The principle of pyramidal error compensation will be described referring to FIG. 3. In the pyramidal error compensation according to this invention, the angle $\alpha$ made of a beam AO incident on the polygon mirror 9 and an XZ plane (main scanning plane) is constantly adjusted in accordance with the portion of the mirror surface used for scanning while the polygon mirror 9 is rotated. In this way, the reflected beam is kept within the XZ plane, whereby preventing the trace line from curving asymmetrically.

Practically, the relationship between the angle $\alpha$ and the pyramidal error $\delta$ (expressed by Equation (8)) is obtained by use of a data which indicating which portion of the mirror surface is used for scanning. According to this relationship, the angle $\alpha$ is fine-adjusted.

Figure 3:
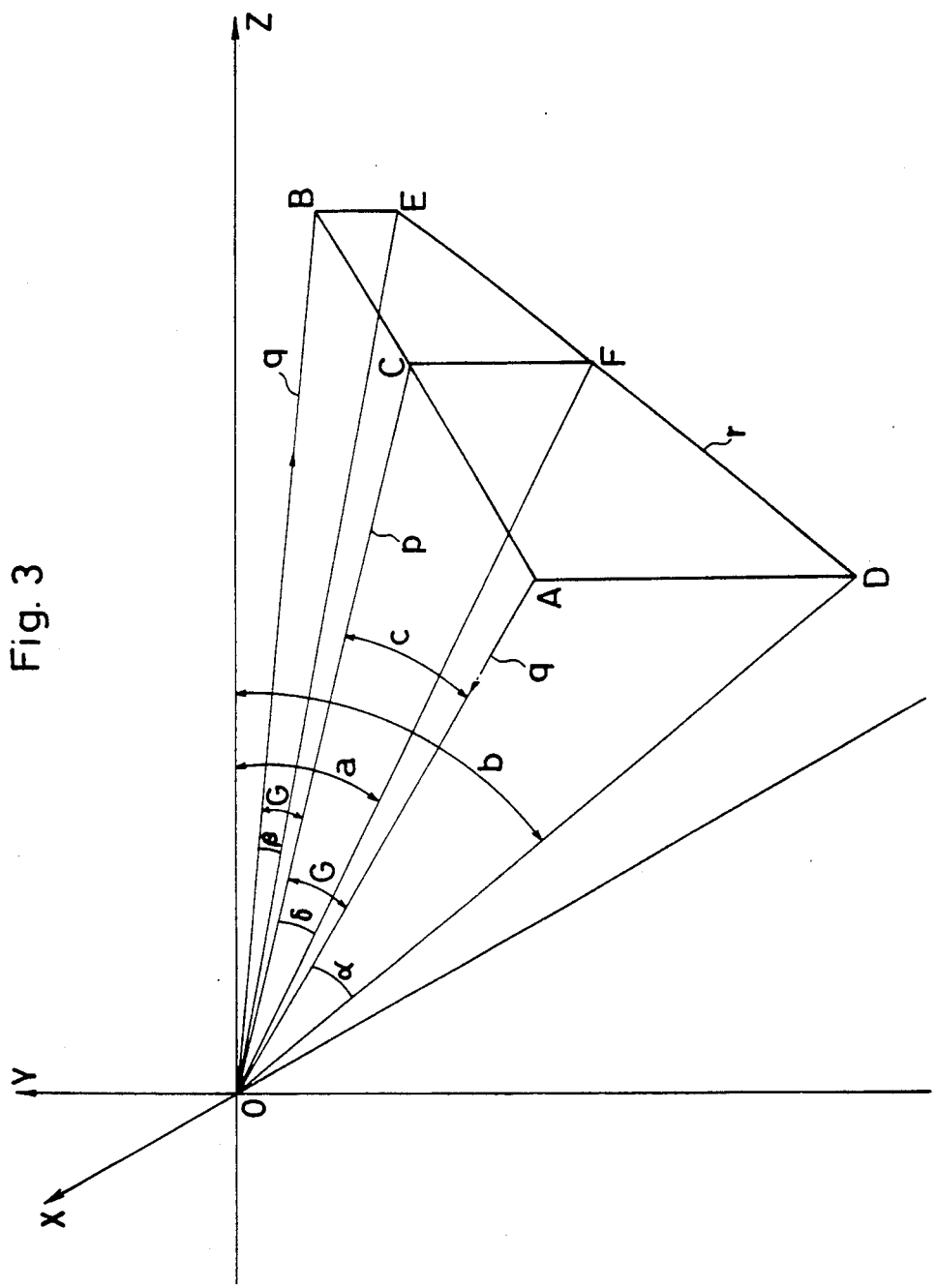
FIG. 3 is a perspective view explaining the definitions of the symbols in this specification.

Referring to FIG. 3, the definition of each symbol will be explained. It should be noted that the mirror surface and the rotating axis of the polygon mirror 9 are both at the origin O for a simpler explanation. (The beam means the main beam LM, hereinafter.)

The geometric optical system in FIG. 3 constitutes an O-XYZ three-dimensional rectangular coordinate system, wherein X is the main scanning direction, Y is the optically equivalent sub scanning direction to the y sub scanning direction in FIG. 2 corresponds with the rotating axis of the polygon mirror 9), and Z is the optical axis of the scanning lens 10. A line segment AO defines the beam incident on the mirror surface from the laser beam source 2 through the AOD 8. The point A is optically equivalent with the laser beam source 2. A line segment OB defines the beam reflected from the mirror surface and led to the photoconductive body 12. A line segment OC defines a normal line on the mirror surface. D, E and F are positions on the XZ plane of perpendiculars from A, B and C, respectively. Accordingly, BE//CF//AD.

Since AO=OB, $\triangle$AOB is an isosceles triangle. Due to the law of reflection, $\angle$AOC=$\angle$BOC. Since the line segment OC is a bisector of a vertical angle $\angle$AOB of $\angle$AOB, $\angle$OCA=$\angle$OCB=90°.

As mentioned before, $\angle$AOD=$\alpha$ is the angle made of the incident beam AO and the XZ plane. $\angle$BOE=$\beta$ is an angle made of the reflected beam OB and the XZ plane. $\angle$COF=$\delta$ is the pyramidal error of the mirror surface.

$\angle$FOZ=a, which is referred to as a nominal rotating angle of the polygon mirror 9, is a rotating angle of the polygon mirror 9 which is measured with the normal line OC as a reference. In other words, $\angle$FOZ=a is an angle made of a projected image of the normal line OC on the XZ plane and the optical axis of the lens 10. $\angle$DOZ=b is an angle made of the incident beam AO and the optical axis of the lens 10 when the angle $\alpha$ is 0.

Where $\angle$AOC=$\angle$BOC=$\angle$G, AO=OB≡q, OC≡p, and DF≡r, Equations (1) through (4) are obtained.

Since $\triangle$AOC is a right-triangle, $$q \cdot \cos G = p \qquad (1)$$

Figure 4:
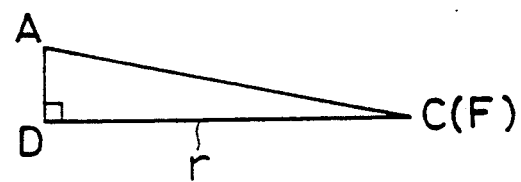
FIG. 4 is a view explaining Equation (2)

From the relationship among three sides of a right-triangle $\triangle$ADC (AC is the hypotenuse and $\angle$-ADC=90°), which is formed when the line segment DF is moved until the point F corresponds with the point C (FIG. 4), $$r^2 = q^2 \cdot \sin^2 G - (q \cdot \sin a - p \cdot \sin \delta)^2 \qquad (2)$$

From the theorem of cosine of $\triangle DOF$, namely, $$DF^2 = DO^2 + OF^2 - 2DO \cdot OF \cdot \cos(a-b),$$

$$r^2 = p^2 \cdot \cos \delta + q^2 \cdot \cos^2 a - 2p \cdot q \cdot \cos a \cdot \cos \delta \cdot \cos(a-b) \qquad (3)$$

Since BE//CF//AD and DF=FE, AD+BE=2CF. Accordingly, $$q \cdot \sin a + q \cdot \sin \beta = 2p \cdot \sin \delta \qquad (4)$$

Equation (1) as modified as:

$$p/q = \cos G \qquad (5)$$

Equations (2) and (3) are expressed as:

$$q^2 \cdot \sin^2 G - (q^2 - \sin^2 a - 2p \cdot q \cdot \sin a \cdot \sin \delta + p^2 \cdot \sin^2 \delta)$$
$$= p^2 \cdot \cos^2 \delta + q^2 \cdot \cos a - 2p \cdot q \cdot \cos a \cdot \cos \delta \cdot \cos(a-b)$$

The above equation is expanded as:

$$q^2(\cos^2 a - \sin^2 G + \sin^2 a) + p^2(\cos^2 \delta + \sin^2 \delta)$$
$$= 2p \cdot q \cdot \{\sin a \cdot \sin \delta + \cos a \cdot \cos \delta \cdot \cos(a-b)\}$$

Namely, $$1 - \sin^2 G + p^2/q^2 = 2 \cdot p/q \{\sin a \cdot \sin \delta + \cos a \cdot \cos \delta \cdot \cos(a-b)\}$$

Obtained by substituting Equation (5) into the above is:

$$\cos^2 G + \cos^2 G = 2 \cos G \cdot \{\sin a \cdot \sin \delta + \cos a \cdot \cos \delta \cdot \cos(a-b)\}$$

Namely,
$$\cos G = \sin a \cdot \sin \delta + \cos a \cdot \cos \delta \cdot \cos(a-b) \qquad (6)$$

Equation (4) is modified as:
$$\sin \beta = 2 \cdot p/q \sin \delta - \sin a$$

Obtained by substituting Equation (6) into the above is:

$$\sin \beta = 2\{\sin a \cdot \sin \delta + \cos a \cdot \cos \delta \cdot \cos(a-b)\}\sin \delta - \sin a \qquad (7)$$
$$= 2 \sin a \cdot \sin^2 \delta + \cos a \cdot \sin 2\delta \cdot \cos(a-b) - \sin a$$
$$= \cos a \cdot \sin 2\delta \cdot \cos(a-b) - \sin a \cdot \cos 2\delta$$

In order that the reflected beam OB is on the XZ plane, it is necessary that $\beta = 0$, namely, $\sin \beta = 0$. Accordingly, $$0 = \cos a \cdot \sin 2\delta \cdot \cos(a-b) - \sin a \cdot \cos 2\delta$$

This is modified as:

$$\sin a \cdot \cos 2\delta = \cos a \cdot \sin 2\delta \cdot \cos(a-b)$$

Obtained by dividing both sides of the above equation by $\cos a \cdot \cos 2\delta$ is:

$$\tan a = \tan 2\delta \cdot \cos(a-b) \qquad (8)$$

If the angle of the incident beam AO on the mirror surface is adjusted by $\alpha$ in accordance with the pyramidal error $\delta$ based on Equation (8), the reflected beam OB is surely reflected on the XZ plane even if the mirror surface has the pyramidal error $\delta$. In other if the incident beam AO is slanted by the angle $\alpha$ with respect to the XZ plane when a normal line on the mirror surface makes the angle a with the optical axis in an optical system, in which the light beam is incident on the mirror surface from a direction which is slanted from the optical axis by the angle b on the XZ plane.

If the angle $\alpha$ is fine-adjusted based on Equation (8) in accordance with the pyramidal error $\delta$, which has been measured in advance, the trace lines are not curved asymmetrically, but are straight and pitched uniformly. As a result, laser beam scanning of excellent precision is realized.

Since $\alpha$ and $\delta$ are extremely small, the angle $\alpha$ may be adjusted based on Equation (9), which is an approximate expression of Equation (8).

$$\alpha = 2\delta \cdot \cos(a-b) \qquad (9)$$

Practical method of compensation

Figure 5:
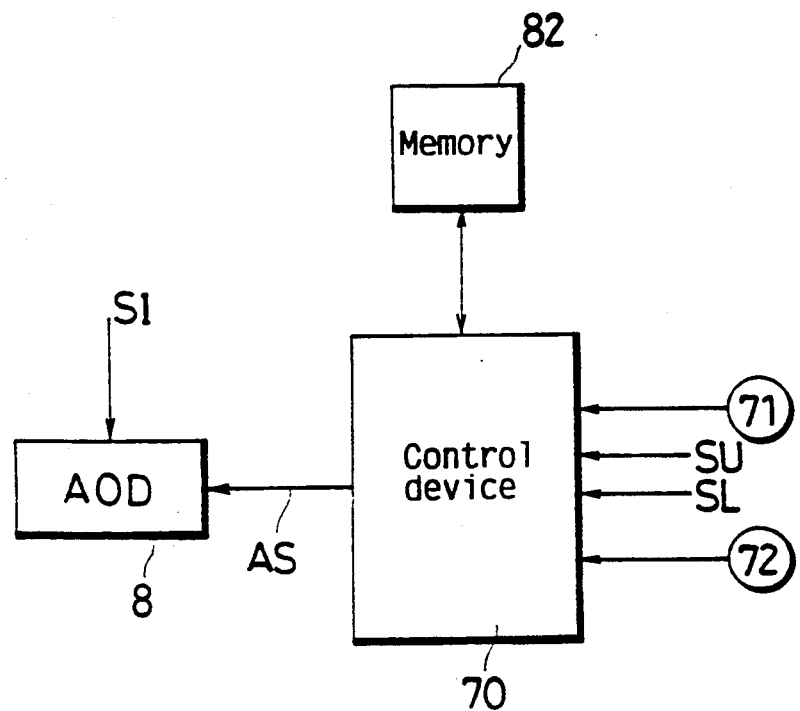
FIG. 5 is a block diagram of a system for fine-adjusting an angle α made of an incident light beam and a main scanning plane.

FIG. 5 is a block diagram of a system for fine-adjusting the angle $\alpha$.

A memory 82 stores data concerning the pyramidal error of each mirror surface, which have been measured in advance and also data concerning the positional relationship among the polygon mirror 9, the scanning lens 10 and the laser beam source 2.

The fine adjustment is done in the following way.

When the beam starts scanning, which portion of Then, a value of the angle $\alpha$ corresponding to the obtained portion is calculated based on Equation (8), and the angle adjusting signal AS corresponding to the calculating result is sent to the AOD 8. The AOD 8 to the signal AS, whereby the reflected beam OB is led to the XZ plane.

Figure 6:
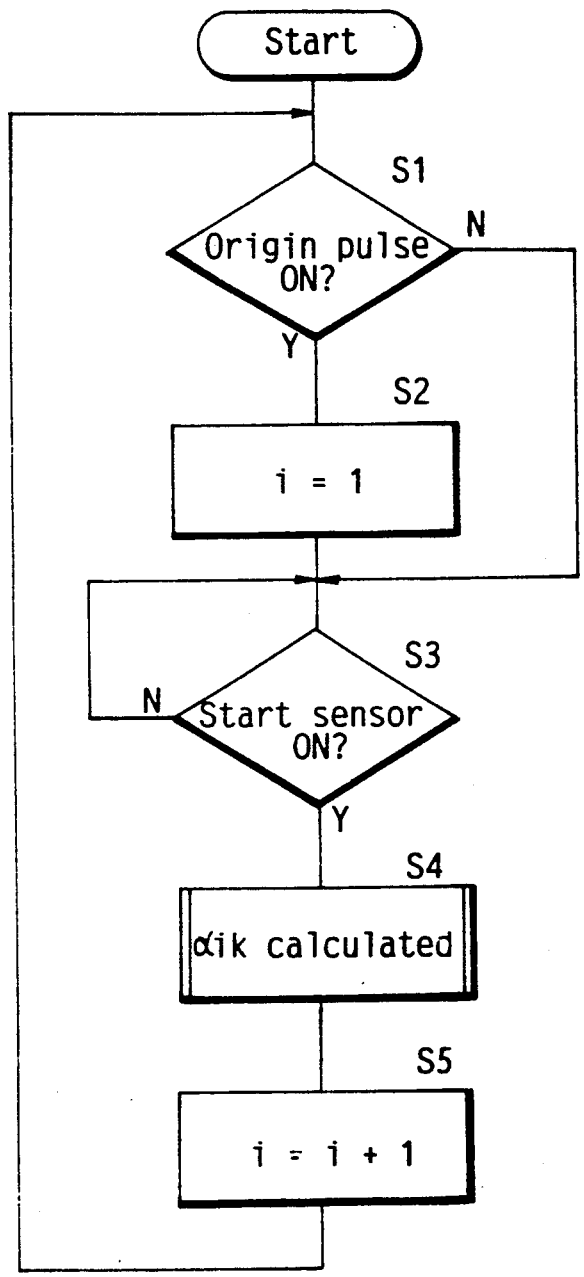
FIG. 6 is a flowchart showing a main routine of a control device.
Figure 7:
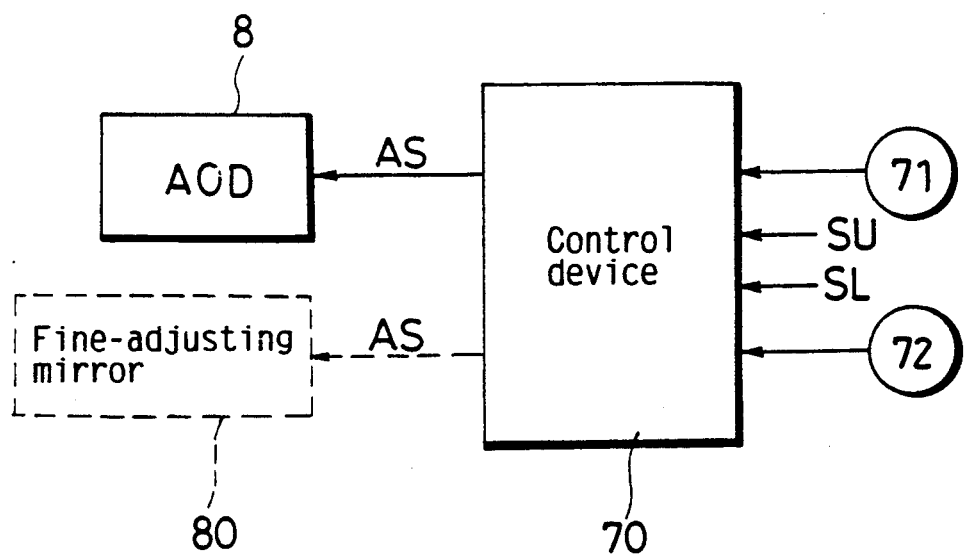
FIG. 7 is a flowchart showing a subroutine of $\alpha_{ik}$ calculation.

The above operation will be described referring to FIGS. 6 and 7. i indicates the ordinal number of the mirror surface, and $\alpha_{ik}$ indicates the value of $\alpha$ at a "k" portion of the i'th mirror surface.

When it is confirmed that the origin pulse generator 72 is turned on in S1, the control device 70 sets i=1 in S2, whereby starting to compensate for the pyramidal error of a first mirror surface. Whether the start sensor 71 is turned on or not is judged in S3. If the start sensor 71 is on, the $\alpha_{ik}$ calculation is executed in S4.

After $\alpha_{ik}$ is obtained, i=i+1 is preparation for the pyramidal error compensation for a second mirror surface. Then, the operation goes back to S1, where whether the origin pulse generator 72 is turned on again or not is judged. If it is judged that the start sensor 71 is turned on without the generator 72 being turned on, the operation of S3 and thereafter is executed for the second pyramidal error compensation. In this way, the pyramidal errors of all the other mirror surfaces are compensated for.

The above operation is repeated once for a rotation of the polygon mirror 9 until the scanning is completed.

The subroutine of the $\alpha_{ik}$ calculation will be described referring to FIG. 7.

The control device 70 sets k=1 in S40, whereby starting to calculate $\alpha_{ik}$ at a first portion of the first mirror surface. In S41, the time which has passed since the start sensor 71 was turned on is counted, and whether the rotating angle $a_k$ of the polygon mirror 9 corresponds to k=1 or not is judged. If so, $\alpha_{ik}$ at the first portion is obtained based on Equation (8) or (9) in S42. The obtained $\alpha_{ik}$ is sent to the AOD 8 as the angle adjusting signal AS in S43. Whether $k=k_{max}$ or not, namely, whether the calculation of the $\alpha_{ik}$ is completed for the whole first mirror surface or not is judged in S44. If so, the operation returns to the main routine. When the start sensor 71 is turned on again, the calculation of the $\alpha_{ik}$ of a second mirror surface is started.

If k is not $k_{max}$ in S44, k is incremented to $k=k+1$ to obtain the $\alpha_{ik}$ of the second portion of the first mirror surface.

As has been described so far, the "static" pyramidal error and the "active" pyramidal error are both surely compensated for by use of Equations (8) or (9).

The AOD 8 is employed for adjusting the angle of the incident beam in this embodiment. The angle of incidence may also be adjusted by a driving device comprising piezoelectric elements or the like, which fine-adjusts a slanting angle of a fine-adjusting mirror.

Which portion of the mirror surface is used for the beam in the scanning may be detected by a position of the beam in the main scanning direction by the photosensor array 100 instead of measuring the time which has passed since the start sensor 71 detected the reference beam LR.

The value of the angle $\alpha$ may be obtained in the following way. The value corresponding to each rotating angle a of each mirror surface is calculated and stored in a memory whose address is the rotating angle a. The rotating angle a of each mirror surface is detected while real scanning. When the address of the memory is designated, the data concerning the angle $\alpha$ is read out from the designated address. According to this method, real-time calculation of the angle $\alpha$ as in S44 is not necessary.

This invention may also be applied to other types of rotatable polygon mirrors (for example a cylindrical mirror with two opposed portions thereof being flat) and to an image reading apparatus.

Although the present invention has been fully described by way of an embodiment with references to the accompanying drawings, it is to be noted that various changes and modifications will be apparent to those skilled in the art. Therefore, unless such changes and modifications depart from the scope of the present invention, they should be construed as being included therein.

What is claimed is:

1. In an image scanning method for compensating for a pyramidal error of a mirror surface of a rotating body having at least two reflective mirror surfaces by fine-adjusting an angle of a light beam incident on the rotating body, the improvement comprising:

putting a scanning lens in such a manner that an optical axis of the scanning lens is orthogonal to a rotating axis of the rotating body; and controlling an angle $\alpha$ made of the incident light beam and a main scanning plate so that equations (I) and (II) are selectively fulfilled, the main scanning plane being orthogonal to the rotating axis and including the optical axis:

$$\tan\alpha = \tan 2\delta \cdot \cos(a-b) \quad \text{(I)}$$

$$\alpha = 2\delta \cdot \cos(a-b) \quad \text{(II)}$$

where a: a rotating angle of a normal line standing on each mirror surface with respect to the optical axis of the scanning lens, b: an angle made of the incident beam and the optical axis of the scanning lens on the main scanning plane, and $\delta$: the pyramidal error of each mirror surface with respect to the rotating axis.

2. An image scanning method of claim 1, wherein the rotating body is a polygon mirror.

3. An image scanning method of claim 2, wherein the rotating angle of the normal line is obtained by a fine unit based on an origin of the rotating axis of the polygon mirror, a start of a main scanning of each mirror surface, and which portion of one of the mirror surfaces is used for scanning judged based on the time from the start of the main scanning of the above one of the mirror surfaces; and wherein the pyramidal error is measured in advance.

4. An image scanning apparatus for compensating for a pyramidal error of a mirror surface of a rotating body having at least two reflective mirror surfaces by fine-adjusting an angle of a light beam incident on the rotating body, the apparatus comprising a scanning lens provided in such a manner that an optical axis thereof is orthogonal to a rotating axis of the rotating body;

detecting means for continuously detecting which portion of which mirror surface of all the mirror surfaces of the rotating body is used for scanning;

compensating amount outputting means for outputting such a value of an angle $\alpha$ that selectively fulfills equations (I) and (II) based on a pyramidal error $\delta$ of each mirror surface measured in advance and the detection result of the detecting means, the angle $\alpha$ being made of the incident light beam and the main scanning plane which is orthogonal to the rotating axis of the rotating body and includes the optical axis of said scanning lens, and the equations (I) and (II) indicating the relationship between the angle $\alpha$ and each portion of the mirror surface, the relationship being required to keep the light beam reflected from the mirror surface within a main scanning plane; and adjusting means for adjusting the angle of the light beam incident on the rotating body by the value outputted by said compensating amount outputting means:

$$\tan\alpha = \tan 2\delta \cdot \cos(a-b) \quad \text{(I)}$$

$$\alpha = 2\delta \cdot \cos(a-b) \quad \text{(II)}$$

where a: a rotating angle of a normal line standing on each mirror surface with respect to the optical axis of said scanning lens, b: an angle made of the incident beam and the optical axis of said scanning lens on the main scanning plane, and $\delta$: the pyramidal error of each mirror surface with respect to the rotating axis.

5. An image scanning apparatus of claim 4, wherein the rotating body is a polygon mirror and said adjusting means is an acoustic optical deflector.

6. An image scanning apparatus of claim 5, wherein said detecting means comprises:

a first detecting section for detecting an origin of the rotating axis of the polygon mirror;

a second detecting section for detecting a start of a main scanning of each mirror surface; and a judging section for judging which portion of one of the mirror surfaces is used for scanning based on the time from the start of the main scanning of the above one of the mirror surfaces;

wherein the rotating angle of the normal line is obtained by a fine unit based on the detection results of the first and second detecting section and on the judging result of the judging section, and wherein the pyramidal error is measured in advance.

7. An image scanning apparatus of claim 6, wherein said compensating amount outputting means includes an operating section for obtaining the value of the angle $\alpha$ by selectively executing the equations (I) and (II) based on the rotating angle a of the normal line, the angle b and the pyramidal error $\delta$.

8. An image scanning apparatus of claim 6, wherein said compensating amount outputting means is memory means whose address is the rotating angel a of the normal line and which stores data concerning a pyramidal error compensating amount corresponding to the address.

9. An image recording apparatus comprising:

light beam generating means for generating a light beam;

a rotating body having at least two reflective mirror surface for making a light beam scan in a main scanning direction;

a scanning lens for focusing the ,light beam on a recording medium;

detecting means for detecting which portion of one of the mirror surfaces is used for scanning;

compensating amount outputting means for outputting such a value of an angle $\alpha$ that selectively fulfills equations (I) and (II) based on a pyramidal error $\delta$ of each result of said detecting means, the angle $\alpha$ being made of the incident light beam and the main, scanning plane which is orthogonal to the rotating axis Of said rotating body and includes the optical axis of said scanning lens, and the equations (I) and (II) indicating the relationship between the angle $\alpha$ and each portion of the mirror surface, the relationship being required to keep the light beam reflected on the mirror surface within a main scanning plane; and adjusting means for adjusting the angle of the light beam incident on said rotating body by the value of outputted by said compensating amount outputting means:

$$\tan\alpha = \tan 2\delta \cdot \cos(a-b) \quad \text{(I)}$$

$$\alpha = 2]\ \delta\cdot\cos(a-b) \quad \text{(II)}$$

where a: a rotating angle of a normal line standing on each mirror surface with respect to the optical axis of said scanning lens, b: an angle made of the incident beam and the optical axis of said scanning lens on the main scanning plane, and $\delta$: the pyramidal error of each mirror surface with respect to the rotating axis.

10. An image recording apparatus of claim 9, wherein said rotating body is a polygon mirror and said adjusting means is an acoustic optical deflector.

11. An image recording apparatus of claim 10, wherein said detecting means comprises:

a first detecting section for detecting an origin of the rotating axis of the polygon mirror;

a second detecting section for detecting a start of a main scanning of each mirror surface; and a judging section for judging which portion of one of the mirror surfaces is used for scanning based on the time from the start of the main scanning of the above one of the mirror surfaces;

wherein the rotating angle of the normal line is obtained by a fine unit based on the detection results of the first and second detecting section and on the judging result of the judging section, and wherein the pyramidal error is measured in advance.

12. An image recording apparatus of claim 11, wherein said compensating amount outputting means includes an operating section for obtaining the value of the angle $\alpha$ by selectively executing the equations (I) and (II) based on the rotating angle a of the normal line, the angle b and the pyramidal error $\delta$.

13. An image recording apparatus of claim 11, wherein said compensating amount outputting means is memory means whose address is the rotating angle a of the normal line and which stores data concerning a pyramidal error compensating amount corresponding to the address.

14. An image recording apparatus of claim 10, further comprising:

light beam dividing means for dividing the light beam generated by said light beam generating means into a main beam and a reference beam which is in parallel with the main beam;

wherein said detecting means comprises:

a first detecting section for detecting an origin of the rotating axis of the polygon mirror;

a second detecting section for detecting a start of a main scanning of each mirror surface; and a photosensor array for outputting a detection signal of the reference beam for each mirror surface.

15. An image recording apparatus of claim 14, wherein said compensating amount outputting means includes an operating section for obtaining the value of the angle by selectively executing the equations (I) and (II) based on the rotating angle a of the normal line, the angle b and the pyramidal error $\delta$.

16. An image recording apparatus of claim 14, wherein said compensating amount outputting means is memory means whose address is the rotating angle a of the normal line and which stores data concerning a pyramidal error compensating amount corresponding to the address.

* * * * *

UNITED STATES PATENT AND TRADEMARK OFFICE
CERTIFICATE OF CORRECTION

PATENT NO. : 5,267,057   Page 1 of 2
DATED : November 30, 1993
INVENTOR(S) : Shigeru Sasada It is certified that error appears in the above-indentified patent and that said Letters Patent is hereby corrected as shown below:

Column 4, line 44, "(AOD)" should read --(AOD) 8--;

Column 6, line 29, "y sub" should read --Y sub--;

Column 6, line 30, before the word "corresponds" insert --(--;

Column 6, line 45, "∠AOB" should read --ΔAOB--;

Column 6, line 66, "∠-ADC" should read --∠ADC--;

Column 7, line 5, "OF²31" should read --OF²--;

Column 7, line 14, "as" (first occurance) should read --is--;

Column 7, line 38, delete "ل" and substitute --.--;

Column 8, line 1, after "other" insert --words, the reflected beam OB is surely the XZ plane--

Column 8, line 30, after "of" insert --which mirror surface is used for scanning is judged.--;

Column 8, line 34, after the second "8" insert --deflects the incident beam AO by an angle corresponding--;

Column 8, line 48, after "is" (second occurance) insert --set in S5 as a--;

Column 9, line 19 and 20, "used for the beam in the" should read --used for--;

UNITED STATES PATENT AND TRADEMARK OFFICE
CERTIFICATE OF CORRECTION

PATENT NO. : 5,267,057
DATED : November 30, 1993
INVENTOR(S) : Shigeru Sasada

It is certified that error appears in the above-indentified patent and that said Letters Patent is hereby corrected as shown below:

Column 10, line 20, after "comprising" insert --:--;

Column 11, line 17, "angel" should read --angle--;

Column 11, line 27, "the, light" should read --the light--;

Column 11, line 34, after "each" insert --mirror surface measured in advance and the detection--;

Column 11, line 36, "main," should read --main--;

Column 11, line 37, "Of" should read --of--;

Column 11, line 52, "21" should read --2--.

Signed and Sealed this

Twentieth Day of December, 1994

Attest:

BRUCE LEHMAN

Attesting Officer        Commissioner of Patents and Trademarks